United States Patent [19]

Brown

[11] Patent Number: 4,856,606

[45] Date of Patent: Aug. 15, 1989

[54] LOCK MECHANISM FOR REAR WHEEL STEER APPARATUS

[75] Inventor: Louis R. Brown, Livonia, Mich.

[73] Assignee: TRW Inc., Lyndhurst, Ohio

[21] Appl. No.: 203,682

[22] Filed: Jun. 7, 1988

[51] Int. Cl.[4] .............................................. B62D 5/06
[52] U.S. Cl. .................................. 180/140; 180/141; 280/91
[58] Field of Search .................. 280/91; 180/236, 141, 180/140

[56] References Cited

U.S. PATENT DOCUMENTS

| | | | |
|---|---|---|---|
| 3,861,705 | 1/1975 | Byrchard et al. | 280/91 |
| 4,645,025 | 2/1987 | Ohe et al. | 180/79.1 |
| 4,650,021 | 3/1987 | Matsuda et al. | 180/219 |
| 4,671,523 | 6/1987 | Naumann | 280/91 |

Primary Examiner—Kenneth R. Rice
Attorney, Agent, or Firm—Tarolli, Sundheim & Covell

[57] ABSTRACT

In a vehicle having steerable front wheels and steerable rear wheels, a movable member is connected with the rear wheels to steer the rear wheels upon movement of the member. A motor moves the member in response to steering the front wheels. Movement of the member is blocked in response to failure of the motor. A switch is provided for selecting between front wheel only steering and combined front and rear wheel steering. When combined front and rear wheel steering is selected, movement of the member is permitted.

21 Claims, 4 Drawing Sheets

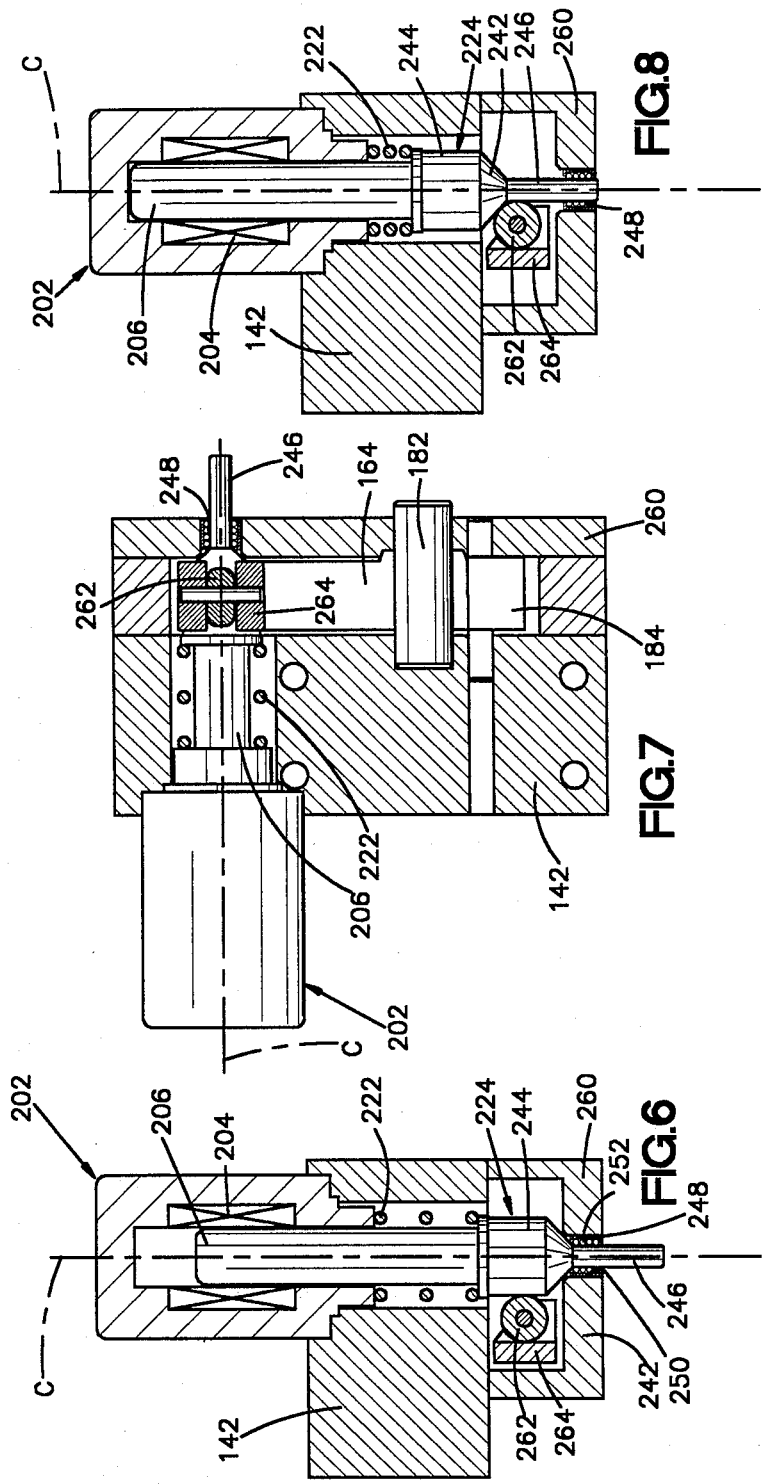

LOCK MECHANISM FOR REAR WHEEL STEER APPARATUS

BACKGROUND OF THE INVENTION

1. Technical Field

The present invention relates to an apparatus for steering the rear wheels of a vehicle. In particular, the present invention relates to an apparatus for selectively locking the rear wheels to prevent turning of the rear wheels.

2. Description of Prior Art

Vehicles having steerable front wheels and steerable rear wheels are known. A steering system for such a vehicle is disclosed in U.S. Pat. No. 4,645,025. The steering system disclosed in U.S. Pat. No. 4,645,025 includes a steering gear for turning the rear wheels in response to steering the front wheels. The steering gear includes a housing supporting a rack member for axial movement. A pinion has teeth in meshing engagement with teeth on the rack member. The pinion is rotated by an electric motor to axially move the rack member to thereby turn the rear wheels. The direction and amount of movement of the rack member is determined by a controller and is a function of vehicle speed and the direction and amount of steering of the front wheels. In the event of a failure of the electric motor, or the like, the rack member is spring biased to a position in which the rear wheels are in a straight-ahead position. There is no positive locking of the rear wheels in the straight-ahead position.

U.S. Pat. No. 4,671,523 discloses a steering system for steering the front wheels and rear wheels of a vehicle. The steering system includes a steering gear for the rear wheels. The steering gear for the rear wheels includes an electric motor which drives a pinion connected with a rack member. When the rack member moves, the rear wheels turn. The rack member has a notch. A locking member is spring biased into the notch to block movement of the rack member and maintain the rear wheels in a straight-ahead position. Pressurized fluid moves the locking member to disengage the rack member.

If a vehicle having the steering system of U.S. Pat. No. 4,671,523 is travelling straight on a laterally angled surface, the rack member will apply a relatively large force to the locking member. Substantial frictional resistance to movement of the locking member to its disengaged position will result. Thus, a relatively large force must be applied to the locking member to disengage the locking member from the rack member. If an electrically actuatable solenoid or motor was used to move the locking member, the size of the solenoid or motor would have to be so great as to make it impractical. Also, when the locking member is in its locking position, it is subjected to relatively high forces applied to it through the rack member from the road. Moreover, the locking member could be subjected to high forces in the event of a system failure. For example, if the electric motor is energized and the locking member is not disengaged from the rack member, the forces applied to the locking member could break the locking member.

SUMMARY OF THE INVENTION

The present invention is directed to a steering system for a vehicle having steerable front wheels and steerable rear wheels. The steering system includes a steering gear for the rear wheels. The steering gear has a movable member connected with the rear wheels to steer the rear wheels upon movement of the member. The member is moved by power assist means in response to steering of the front wheels. Movement of the member is blocked in response to a failure of the power assist means.

In a preferred embodiment, the member is a rack member of a rack and pinion steering gear. The power assist means is an electric motor for axially moving the rack member. A pinion has teeth in meshing engagement with teeth on the rack member. The pinion is rotatable in response to axial movement of the rack member. A collar member is connected to the pinion and has a notch therein. A locking member is movable into the notch in the collar to block rotation of the collar and pinion. Blocking rotation of the pinion thereby blocks axial movement of the rack member and thus, turning of the rear wheels.

The position of the locking member is controlled by a solenoid. When the solenoid is energized, the locking member moves to a position disengaged from the notch in the collar. When the locking member is disengaged from the notch in the collar, rotation of the pinion is permitted thereby allowing axial movement of the rack member and turning of the rear wheels. When the solenoid is not energized, a spring moves the locking member toward the collar.

The steering system also includes a switch for manually selecting either front wheel only steering or combined front and rear wheel steering. When the switch is moved to a position selecting combined front and rear wheel steering, the solenoid is energized to move the locking member to the position permitting turning of the rear wheels.

BRIEF DESCRIPTION OF THE DRAWINGS

Further features of the present invention will become apparent to those skilled in the art to which the present invention relates from reading the following specification with reference to the accompanying drawings, in which:

FIG. 6 is a cross sectional view of the locking mechanism of FIG. 4 taken approximately along line 6—6 of FIG. 4;

FIG. 7 is a cross sectional view of the locking mechanism of FIG. 4 taken approximately along line 7—7 of FIG. 4; and FIG. 8 is a cross sectional view of the locking mechanism of FIG. 5 taken approximately along line 8—8 of FIG. 5.

DESCRIPTION OF A PREFERRED EMBODIMENT

Figure 1:
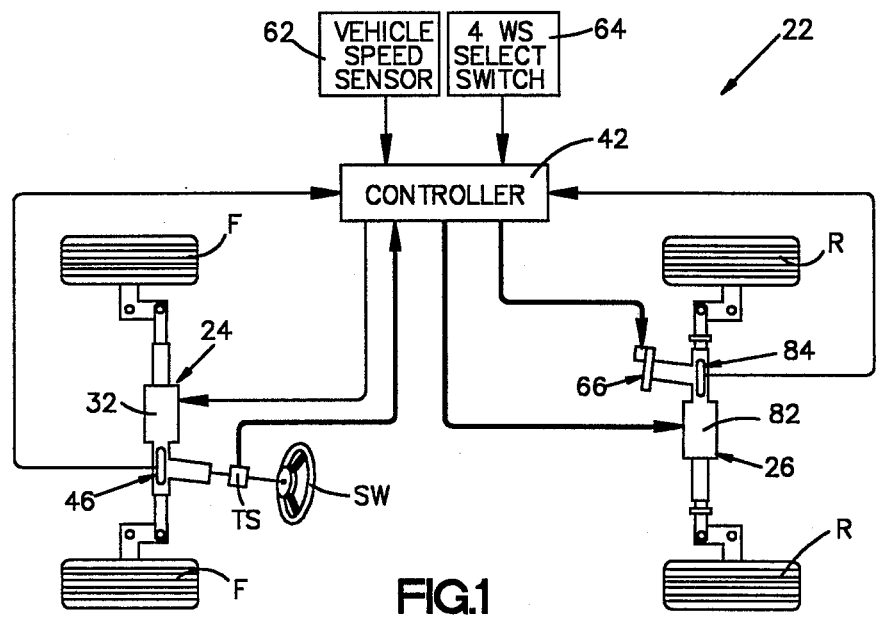
FIG. 1 is a schematic view of a four wheel steering system for a vehicle having steerable front wheels and steerable rear wheels.

The present invention may be embodied in a number of different vehicle steering systems for steering the front wheels and the rear wheels of a vehicle. As representative, the present invention is illustrated in FIG. 1 as embodied in a steering system 22 for a vehicle having steerable front wheels F and steerable rear wheels R. The steering system 22 includes a steering gear 24 for steering the front wheels F and a steering gear 26 for steering the rear wheels R. The steering gears 24, 26 could be identical rack and pinion steering gears each having an electric motor for power assist. However, the steering gears 24, 26 do not have to be identical. Also, either the steering gear for the front wheels F and/or the steering gear for the rear wheels R could be fluid power assist steering gears.

The steering gear 24 for the front wheels F is similar in design and operation to the steering gear disclosed in U.S. Pat. No. 4,666,014 which is fully incorporated herein by reference. The steering gear 24 for the front wheel F is connected to a manually operated steering wheel SW, as is known. A torque sensor TS is connected between the steering wheel SW and the steering gear 24 for the front wheels F. The torque sensor TS generates a signal indicative of the magnitude and direction of the torque applied thereto and communicates the signal to a controller 42.

The controller 42 processes the signal from the torque sensor TS and applies electric power to an electric motor 32 of the steering gear 24 for the front wheels F. The electric motor 32 axially moves a rack member (not shown) connected with the front wheels F to steer the front wheels in a direction corresponding to the direction that the steering wheel SW is turned and to an extent until no torque is sensed by the torque sensor TS. A position sensor 46 connected with the rack member of the steering gear 24 senses the axial position of the rack member relative to an initial position of the rack member corresponding to a straight-ahead position of the front wheels F. The position sensor 46 generates a signal corresponding to the direction and amount of movement from the initial position and communicates the signal to the controller 42. The position sensor 46 is preferably a known linear voltage differential transformer (LVDT).

The controller 42 monitors a speed sensor 62 which senses vehicle speed. The controller 42 also monitors the position of a four wheel steering select switch 64. The switch 64 is manually movable to select between front wheel only steering and combined front and rear wheel steering. When the switch 64 is moved to a position in which combined front and rear wheel steering is selected, the controller 42 signals a locking mechanism 66 connected to the rear wheel steering gear 26 to unlock the steering gear 26 and permit steering movement of the rear wheels R.

When the steering gear 26 is unlocked and the steering wheel SW is turned, the controller 42 applies electric power to an electric motor 82 of the rear wheel steering gear 26 to turn the rear wheels R in a desired direction and to an extent as determined by a control program stored in the controller as a function of vehicle speed. For example, if combined front and rear wheel steering is selected at the switch 64, and the vehicle is moving at a speed below a predetermined speed, the rear wheels R will be steered in an opposite direction relative to the direction that the front wheels F are steered. If the vehicle is travelling above the predetermined speed, the rear wheels R will be steered in the same direction as the front wheels F. The locking mechanism 66 locks the rear wheels R from angular movement when front wheel only steering is selected by the switch 64 or when power assist to the rear wheel steering gear is lost.

Figure 2:
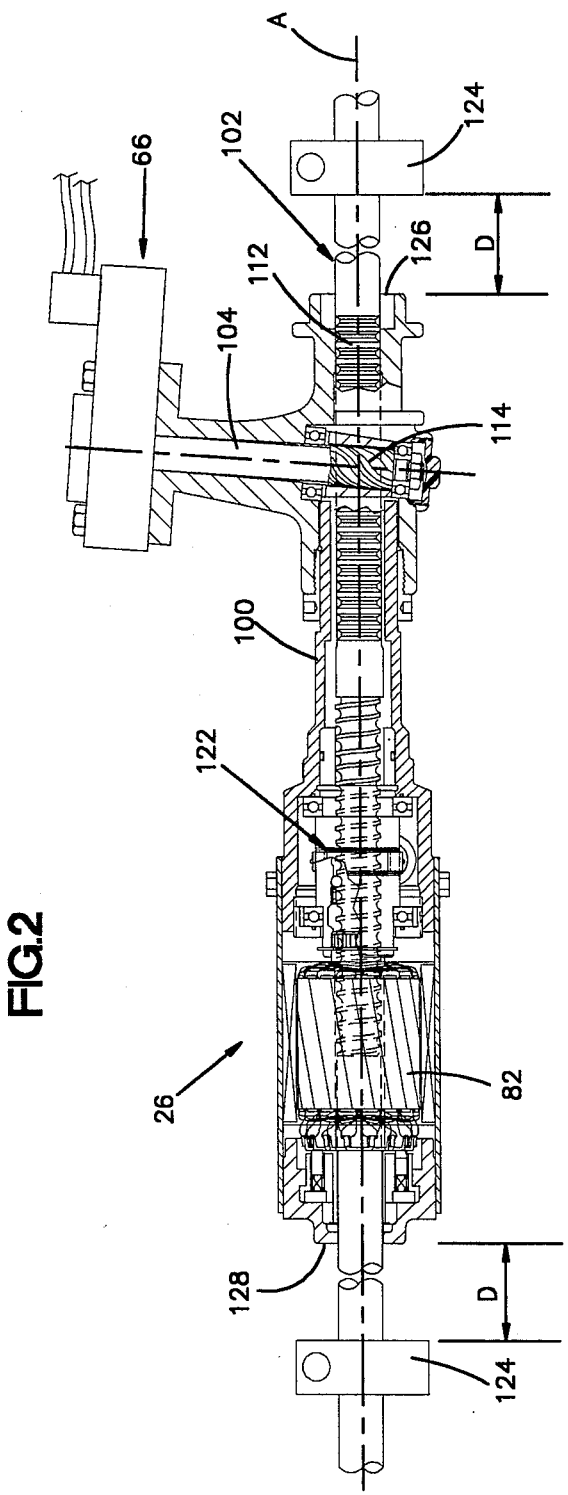
FIG. 2 is a cross sectional view of a steering gear for the rear wheels of the steering system illustrated in FIG. 1.

A steering position sensor 84 for the rear wheel steering gear 26 is similar to the sensor 46 for the front wheel steering gear 24. The sensor 84 senses the position of a rack member 102 (FIG. 2), which is connected with the rear wheels R, relative to an initial position corresponding to the straight-ahead position of the rear wheels. The sensor 84 generates a signal indicative of the direction and amount of movement of the rack member 102 from the initial position and communicates the signal to the controller 42. The controller 42 processes the information from the sensor 84 to insure that the position of the rear wheels R corresponds to a desired position (within a tolerance band) determined by the controller 42.

The steering gear 26 (FIG. 2) for the rear wheels R is similar in design and operation to the steering gear disclosed in U.S. Pat. No. 4,666,014, referred to above. The steering gear 26 includes a housing 100 supporting the rack member 102 for axial movement in a direction along a longitudinal central axis A of the rack member. A plurality of rack teeth 112 are formed on the rack member 102. A pinion 104 is supported for rotation about its longitudinal central axis B by the housing 100. The pinion 104 has a plurality of pinion teeth 114 for meshing engagement with the rack teeth 112 on the rack member 102. The pinion 104 rotates about the axis B in response to movement of the rack member 102 along the axis A. The electric motor 82 is connected with the rack member 102 through a ball nut drive 122. Thus, upon actuation of the motor 82, in response to receiving a signal from the controller 42, the rack member 102 moves axially relative to the housing 100 along the axis A and the pinion rotates about the axis B.

A pair of stops 124 are connected to axially opposite end portions of the rack member 102. Each of the stops 124 is an annular member which is clamped to the rack member 102. The stops 124 are located outside of the housing 100 and are spaced away from the housing a distance D. When the rack member 102 moves to the left along the axis A, as viewed in FIG. 2, an amount equal to the distance D, the right stop 124 engages an end 126 of the housing 100 to block further movement of the rack member to the left. The left stop 124 blocks movement of the rack member 102 to the right. The distance D that the stops 124 are spaced from the respective ends 126, 128 of the housing 100 limits angular movement of the steerable rear wheels R to a displacement of preferably not more than five degrees in either direction from the straight-ahead position.

Figures 4, 5:
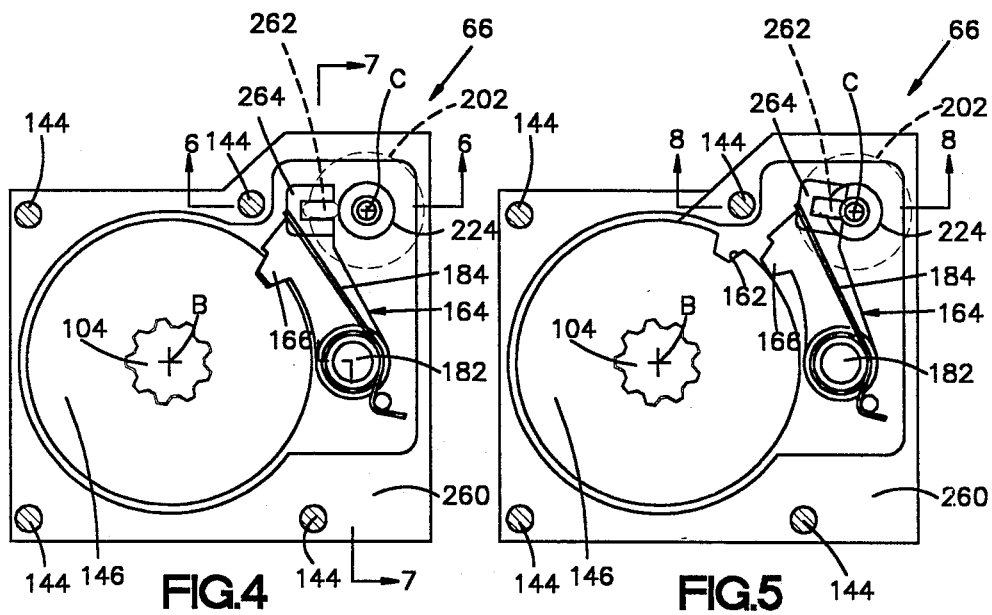
FIG. 4 is a cross sectional view of a locking mechanism of the steering gear of FIG. 3 taken approximately along line 4—4 of FIG. 3.
FIG. 5 is a view similar to FIG. 4 illustrating parts in different positions.
Figure 3:
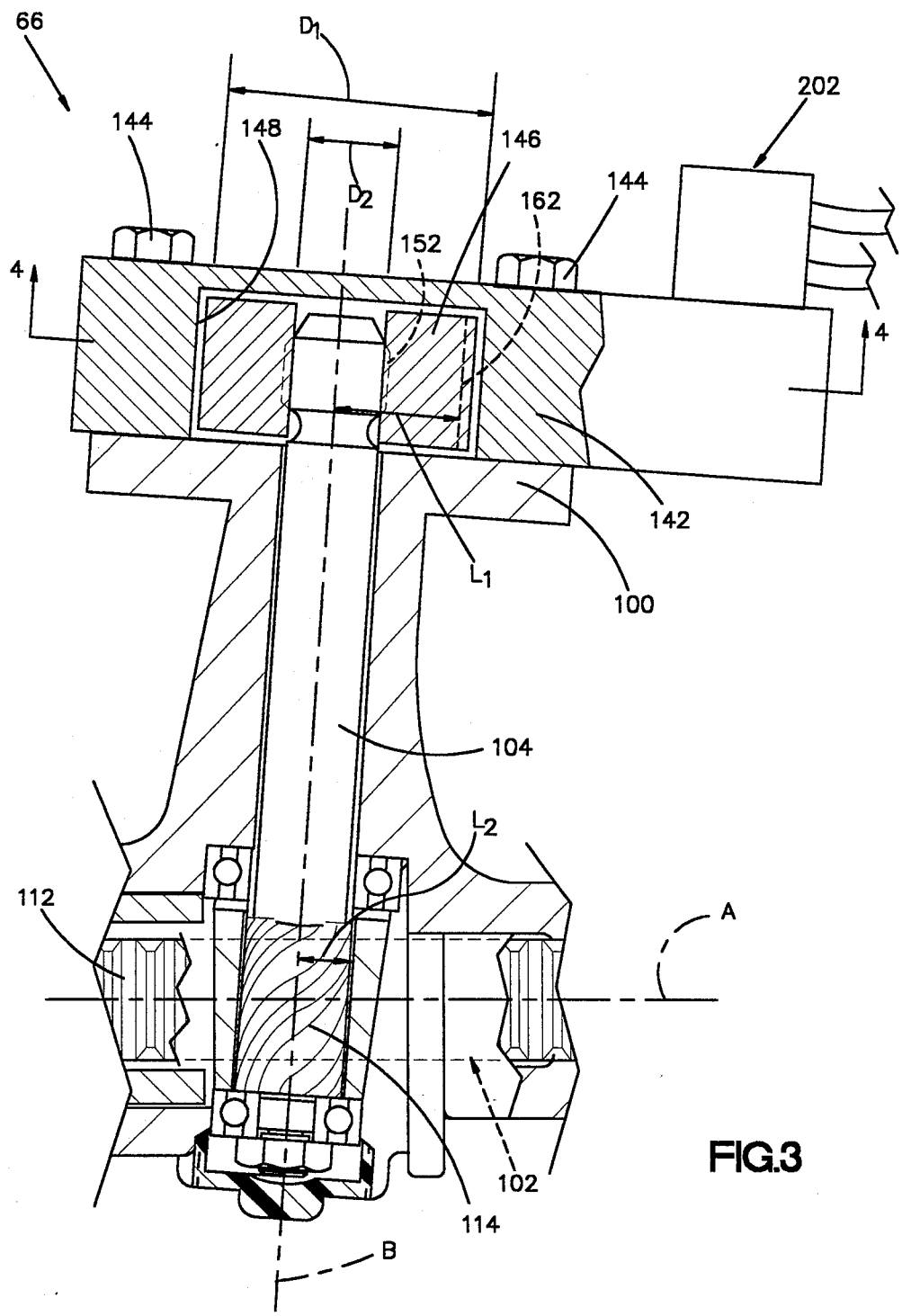
FIG. 3 is an enlarged cross sectional view of a portion of the steering gear of FIG. 2.

The locking mechanism 66 includes a housing 142 (FIG. 3) connected to the housing 100 by fasteners 144. A collar 146 is received in an opening 148 extending through the housing 142. The collar 146 is ring shaped and connected to the pinion 104 by a known spline connection 152. Thus, the collar 146 rotates with the pinion 104. The collar 146 has a surface defining a notch 162 (best seen in FIG. 5) in its outer circumference. The notch 162 is located in the collar 146 in a position for receiving a locking portion 166 of a locking member 164 when the rear wheels R are in the straight-ahead position to lock the rear wheels in the straight-ahead position.

The locking member 164 (FIG. 4) is supported at one end for pivotal movement by a pin 182 received in the housing 142. The locking member 164 is pivotable about the axis of the pin 182 between locking and unlocking positions. When the locking member 164 is in its locking position, the end portion 166 of the locking member 164 is received in the notch 162 in the collar 146. When the end portion 166 of the locking member 164 is received in the notch 162 in the collar 146, rotation of the collar 146 is blocked. Thus, rotation of the pinion 14, axial movement of the rack member 102 and turning movement of the rear wheels R are also blocked. When the end portion 166 of the locking member is disengaged from notch 162 in the collar 146, rotation of the collar 146 and pinion 104, axial movement of the rack member 102 and turning of the rear wheels R are possible.

The collar 146 has an outer diameter $D_1$ (FIG. 3) which is preferably at least three times the diameter $D_2$ of the pitch circle of the teeth 114 on the pinion 104. The notch 162 is spaced from the axis B of the pinion 104 resulting in a minimum effective lever arm $L_1$ (FIG. 3) through which the locking portion 166 of the locking member 164 acts on the pinion 104. The rack member 102 also acts on the pinion 104 through another lever arm $L_2$ which is shorter than the lever arm $L_1$. Because of the differences in the lengths of the lever arms $L_1$ and $L_2$, forces acting on the pinion 104 through the lever arm $L_l$ have a mechanical advantage. Thus, the force applied to the collar 146 to prevent the pinion 104 from rotating may be smaller than the force applied to the pinion 104 acting to rotate the pinion. Thus, the locking portion 166 of the locking member 164 does not require the size nor strength that would be required if it engaged a notch in the pinion 104 or in the rack member 102.

The position of the locking member 164 is controlled by a solenoid 202. The solenoid 202 (FIG. 6) is connected to the housing 142 of the locking mechanism 66. The solenoid 202 includes a coil 204 and a plunger 206 which is axially movable within the solenoid along a longitudinal central axis C of the solenoid upon the application of electrical power to the coil. The controller 42 controls the application of electrical power to the solenoid 202. A spring 222 normally biases the plunger 206 downwardly, to the position illustrated in FIGS. 4, 6 and 7, when electrical power is not applied to the solenoid 202.

A cam member 224 is connected to the plunger 206. The cam member 224 includes a frustoconical tapered portion 242 and a cylindrical body portion 244. A pilot shaft 246 is connected to the cam member 224 and extends along the axis C. The pilot shaft 246 is received in a bearing 248 supported in a bore 250 in a lower portion 260 of the housing 142. The bearing 248 includes a plurality of ball bearings 252 supported in a tubular cage. The pilot shaft 246 and bearing 248 enable the cam member 224 to move axially along the axis C with relatively little frictional resistance. A disk-shaped cam follower 262 is received in portion 264 of the locking member 164. The follower 262 engages both the cylindrical body portion 244 of the cam member 224 and the locking member 164. The force of the spring 222 is greater than the force of the spring 184 and, thus, the locking member 164 is forced by spring 222 in a direction away from the axis C of the solenoid 202 toward its locking position. Thus, when no electrical power is applied to the solenoid 202, the locking member 164 is biased by the spring 222 toward its locking position.

When electrical power is applied to the solenoid 202, the plunger 206 moves the cam member 224 and the pilot shaft 246 upwardly along the axis C from the position illustrated in FIGS. 6 and 7 to the position illustrated in FIG. 8. The cam follower 262 engages the frustoconical tapered portion 242 of the cam member 224 which permits the end portion 166 of the locking arm 164 to pivot toward the axis C of the solenoid 202 and away from the collar 146 until the cam follower engages the pilot shaft 246. When the locking member 164 pivots about the pin 182 away from the collar 146, from its locking position illustrated in FIG. 4 to its unlocking position illustrated in FIG. 5, the locking portion 166 disengages the notch 162. The collar 146 and pinion 104 are then free to rotate about the axis B. Thus, since the pinion 104 is free to rotate about the axis B the rack member 102 is free to move axially along the axis A and the rear wheels R may be turned from the straight-ahead position under the application of the force applied by the motor 82. Because of the bearing 248, a relatively small force generated by the solenoid 202 is sufficient to move the plunger 206 and cam member 224 along the axis C to unlock the steering gear 26 for the rear wheels R even if a large lateral force is applied to the rack 102.

The controller 42 applies electrical power to the solenoid 202 in certain situations. For example, the controller 42 applies electrical power to the solenoid 202 when the switch 64 is moved to the position selecting combined front and rear wheel steering. When the switch 64 is moved to a position in which front wheel only steering is selected, the controller 42 does not apply electrical power to the solenoid 202. As noted above, when the solenoid 202 is de-energized, the locking portion 166 of the locking member 164 is biased toward the collar 146 by the spring 222 and cam member 224. When the rear wheels R are in the straight-ahead position, the locking portion 166 of the locking member 164 extends into the notch 162 in the collar 146 when the solenoid is de-energized to lock the rear wheels R in the straight-ahead position.

If the rear wheels R are not in the straight-ahead position when the solenoid 202 is de-energized, the notch 162 is not aligned with the locking portion 166 of the locking member 164 and the locking portion engages the periphery of the collar 146. The notch 162 will not receive the locking portion 166 of the locking member 164 until the rear wheels R move to a straight-ahead position and the notch 162 is aligned with the locking portion 166 of the locking member 164. The geometry of the suspension system (i.e. the camber and caster of the rear wheels R) is such that the rear wheels R will move to the straight-ahead position in the absence of power assist.

When a failure to the motor 82 occurs or loss of electrical power for driving the motor occurs in the absence of the locking mechanism 66 embodying the present invention, the rear wheels R would tend to move uncontrollably between their turning limits. When the controller 42 detects such a failure in the motor 82 or a failure in the power supplied to the motor, the controller shuts off electrical power to the solenoid 202 to lock the rear wheels R in the straightahead position. Furthermore, if the controller 42 or solenoid 202 fails, the solenoid is de-energized and the locking member 164 is normally biased to its locking position. Thus, with the locking mechanism 66, the rear wheels R are locked in the straight-ahead position in the event of a failure in the motor 82, controller 42 or solenoid 202.

From the above description of a preferred embodiment of the invention, those skilled in the art will perceive improvements, changes and modifications. Such improvements, changes and modifications within the skill of the art are intended to be covered b the appended claims.

Having described a preferred embodiment of the invention, I claim:

1. An apparatus for use in a vehicle having steerable front wheels and steerable rear wheels, said apparatus comprising:
   a movable rack member connected with the rear wheels to steer the rear wheels upon movement of said rack member;
   a rotatable pinion member rotatably driven by a force of a first magnitude by movement of said rack member;
   means for applying a force to said rack member to move said rack member to steer the rear wheels in response to steering of the front wheels; and
   lock means including a locking member movable between an unlocking position and a locking position for blocking rotation of said pinion member by application of a force of a second magnitude to block movement of said rack member and thereby block steering of the rear wheels, said second magnitude being less than said first magnitude.

2. The apparatus set forth in claim 1 wherein said lock means further includes a collar member connected with said pinion member and having surface means defining a notch, said locking member being engageable with said surface means defining the notch in said collar member when said locking member is in its locking position.

3. The apparatus set forth in claim 2 wherein said collar member is annular and is coaxial with said pinion member, said collar member having an outer circumference with a diameter which is at least three times the diameter of the pitch circle of said pinion member, said surface means defining a notch being located in said outer circumference of said collar member.

4. An apparatus for use in a vehicle being steerable front wheels and steerable rear wheels, said apparatus comprising:
   a movable member connected with the rear wheels to steer the rear wheels upon movement of said member;
   means for moving said member in response to steering the front wheels of the vehicle;
   lock means having a locking member movable between a first position blocking movement of said member and second position permitting movement of said member;
   means for selecting between front wheel only steering and combined front wheel and rear wheel steering; and
   means for moving said locking member of said lock means to its second position in response to selecting combined front wheel and rear wheel steering;
   wherein said member is a rack member movable along its longitudinal axis and having a plurality of teeth, and further including a pinion member having a plurality of teeth in meshing engagement with said teeth on said rack member, said pinion member being rotated in response to axial movement of said rack member, said lock means comprising a collar member connected with said pinion member, said collar member having surface means defining a notch, and a locking member engageable with said surface means defining the notch in said collar member when said locking member is in its first position.

5. The apparatus set forth in claim 4 further including a cam member engaging said locking member and urging said locking member to its first position, said including a solenoid having a plunger connected to said cam member for moving said cam member to a position allowing said locking member to move to its second position upon energization of said solenoid, and a spring for biasing said locking member to its second position upon energization of said solenoid.

6. An apparatus for use in a vehicle having steerable front wheels and steerable rear wheels, said apparatus comprising:
   means for steering the rear wheels of the vehicle including a movable member connected with the rear wheels to steer the rear wheels upon movement of said member;
   assist means for providing a power assist to move said member in response to steering the front wheels; and
   means for blocking movement of said member in response to a failure of said assist means.

7. The apparatus set forth in claim 6 wherein said member is a rack member which is movable in a direction along its longitudinal central axis and wherein said assist means comprises a motor connected with said rack member to move said rack member to steer the rear wheels.

8. The apparatus set forth in claim 7 wherein said motor comprises an electric motor.

9. An apparatus for use in a vehicle having steerable front wheels and steerable rear wheels, said apparatus comprising:
   means for steering the rear wheels of the vehicle including a movable member connected with the rear wheels to steer the rear wheels upon movement of said member;
   assist means for providing a power assist to move said member in response to steering the front wheels; and
   means for blocking movement of said member in response to a failure of said assist means;
   wherein said member is a rack member which is movable in a direction along its longitudinal central axis and wherein said assist means comprises as electric motor connected with said rack member to move said rack member to steer the rear wheels;
   said blocking means comprising a rotatable pinion member in meshing engagement with said rack member and rotatably driven by axial movement of said rack member, a collar member connected with said pinion member and having surface means defining a notch, and a locking member movable between an unlocking position spaced from the notch and a locking position engaging said surface means defining the notch in said collar member to block rotation of said collar and said pinion member to thereby block axial movement of said rack member.

10. The apparatus set forth in claim 9 wherein said collar member is annular and is coaxial with said pinion member, said collar member having an outer circumference with a diameter which is at least three times the diameter of the pitch circle of said pinion member, said surface means defining a notch being located in said outer circumference of said collar member.

11. The apparatus set forth in claim 9 further including means biasing said locking member toward said locking position.

12. The apparatus set forth in claim 11 wherein said biasing means includes a first spring and a cam member, said first spring biasing said cam member to a position urging said locking member to said locking position, and further including a solenoid actuatable to move said cam member to a position permitting said locking member to move to said unlocking position and a second spring biasing said locking member against said cam member and to said unlocking position, the spring force of said second spring being lower than the spring force of said first spring.

13. An apparatus for use in a vehicle having steerable front wheels and steerable rear wheels, said apparatus comprising:
 a movable first member connected with the rear wheels to steer the rear wheels upon movement of said first member;
 a rotatable second member rotatably driven by movement of said first member;
 means for applying a force to said first member to steer the rear wheels in response to steering of the front wheels;
 lock means including a locking member movable between an unlocking position and a locking position for blocking rotation of said second member to block movement of said first member and thereby block steering of the rear wheels; and
 means for moving said locking member between its locking and unlocking positions, said moving means comprising a first step and a cam member, said first spring urging said cam member to move said locking member to its locking position, a solenoid for moving said cam member to a position allowing said locking member to move to its unlocking position permitting rotation of said second member when said solenoid is energized, and a second spring biasing said locking member to its unlocking position when said solenoid is energized, the spring force of said second spring being lower than the spring force of said first spring.

14. The apparatus set forth in claim 13 further including means for selecting between front wheel only steering and combined front and rear wheel steering and means for energizing said solenoid in response to selecting combined front and rear wheel steering.

15. The apparatus set forth in claim 14 further including means for de-energizing said solenoid in response to a failure of said means for applying a force to said first member to steer the rear wheels.

16. An apparatus for use in a vehicle having steerable front wheels and steerable rear wheels, said apparatus comprising:
 a movable first member connected with the rear wheels to steer the rear wheels upon movement of said first member;
 a rotatable second member rotatably driven by movement of said first member;
 means for applying a force to said first member to steer the rear wheels in response to steering of the front wheels; lock means including:
  a locking member movable between an unlocking position and a locking position blocking rotation of said second member to thereby block movement of said first member;
  a collar member connected with said second member and having surface means defining a notch;
  said locking member being engageable with said surface means defining the notch in said collar member when said locking member is in its locking position; and
 means for moving said locking member between its locking and unlocking positions, said moving means comprises:
  a first spring and a cam member, said first spring urging said cam member to move said locking member to its locking position;
  a solenoid for moving said cam member to a position allowing said locking member to move to its unlocking position permitting rotation of said second member when said solenoid is energized; and
  a second spring biasing said locking member to its unlocking position, the spring force of said second spring being lower than the spring force of said first spring.

17. The apparatus set forth in claim 16 further including a pilot shaft connected to said cam member to guide movement of said cam member and low friction bearing means for receiving said pilot shaft and guiding movement of said pilot shaft relative to said bearing means.

18. The apparatus set forth in claim 16 further including means supporting said locking member for pivotal movement between its locking and unlocking positions.

19. The apparatus set forth in claim 16 further including means for limiting the amount of movement of said first member comprising a stop connected to said first member and a housing supporting said first member for movement, said stop being located in said first member to engage a portion of said housing and block movement of said first member when said first member moves in one direction a predetermined amount.

20. The apparatus set forth in claim 16 further including means for selecting between front wheel only steering and combined front and rear wheel steering and means for energizing said solenoid in response to selecting combined front and rear wheel steering.

21. The apparatus set forth in claim 20 further including means for de-energizing said solenoid in response to a failure of said means for applying a force to said first member to steer the rear wheels.

* * * * *

UNITED STATES PATENT AND TRADEMARK OFFICE
CERTIFICATE OF CORRECTION

PATENT NO. : 4,856,606

DATED : August 15, 1989

INVENTOR(S) : Louis R. Brown

It is certified that error appears in the above-identified patent and that said Letters Patent is hereby corrected as shown below:

Column 7, Line 40, change "being" to --having--.

Signed and Sealed this

Twenty-first Day of August, 1990

*Attest:*

HARRY F. MANBECK, JR.

*Attesting Officer*   *Commissioner of Patents and Trademarks*